Figure 1:
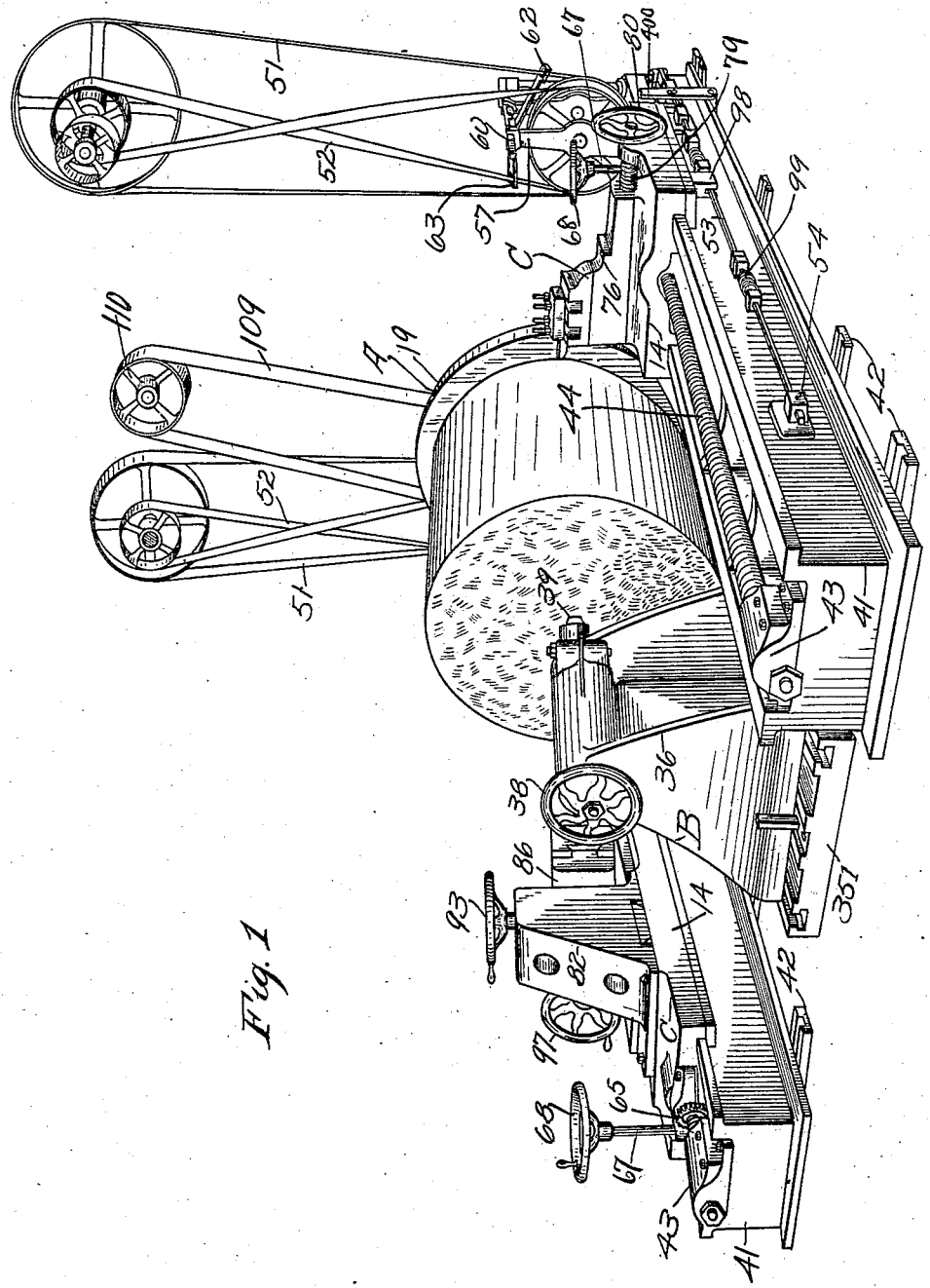

No. 855,234. PATENTED MAY 28, 1907.
J. S. DETRICK & J. W. NEIDHARDT.
STONE TURNING AND CUTTING MACHINE.
APPLICATION FILED JAN. 30, 1906.

6 SHEETS—SHEET 1.

Witnesses:
Frank H. Donahue.
Robert Adt.

Inventors:
Joseph W. Neidhardt.
Jacob S. Detrick,
By their attorney
F. H. Richards.

No. 855,234. PATENTED MAY 28, 1907.
J. S. DETRICK & J. W. NEIDHARDT.
STONE TURNING AND CUTTING MACHINE.
APPLICATION FILED JAN. 30, 1906.

6 SHEETS—SHEET 2.

Witnesses,
F. H. Donahue.
Robert Adt.

Inventors:
Joseph W. Neidhardt.
Jacob S. Detrick,
By their attorney F. H. Richards.

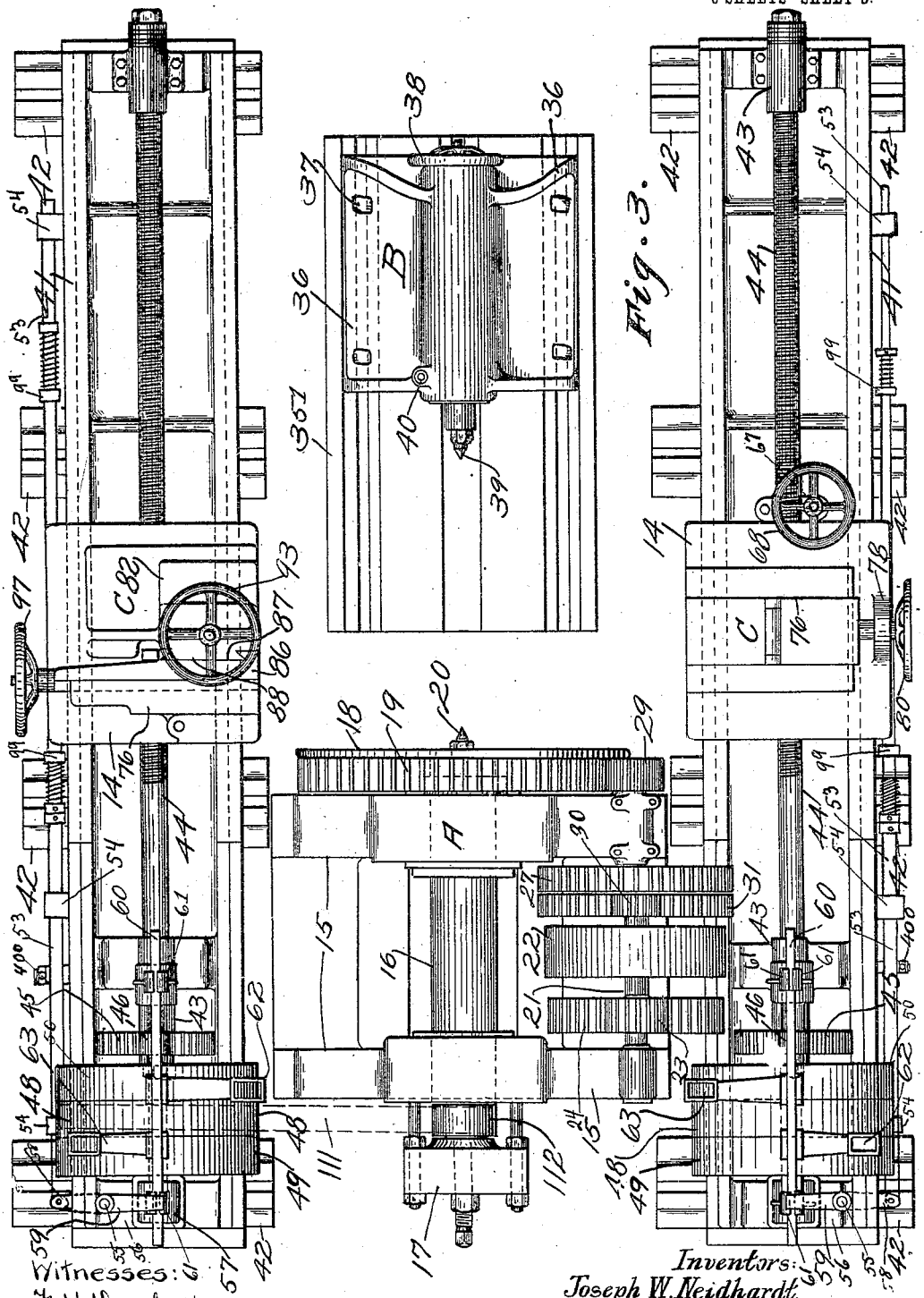

No. 855,234. PATENTED MAY 28, 1907.
J. S. DETRICK & J. W. NEIDHARDT.
STONE TURNING AND CUTTING MACHINE.
APPLICATION FILED JAN. 30, 1906.
6 SHEETS—SHEET 4.
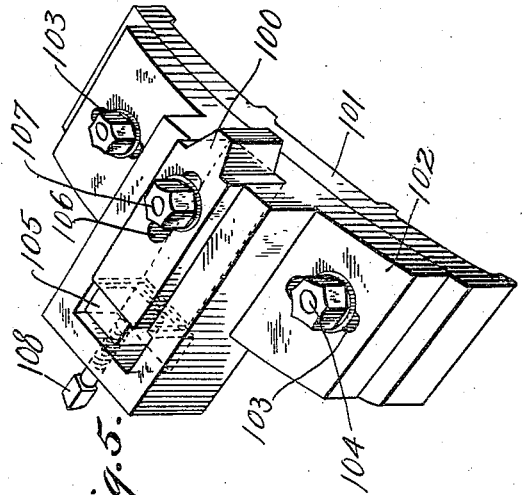
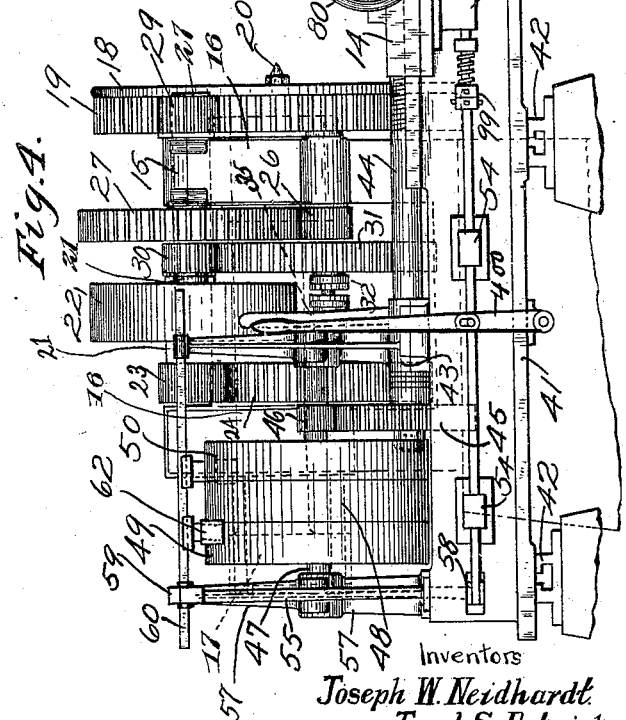
Witnesses:
J. H. Donahue
Robert Adt
Inventors
Joseph W. Neidhardt,
Jacob S. Detrick,
By their Attorney, F. H. Richards.

No. 855,234. PATENTED MAY 28, 1907.
J. S. DETRICK & J. W. NEIDHARDT.
STONE TURNING AND CUTTING MACHINE.
APPLICATION FILED JAN. 30, 1906.
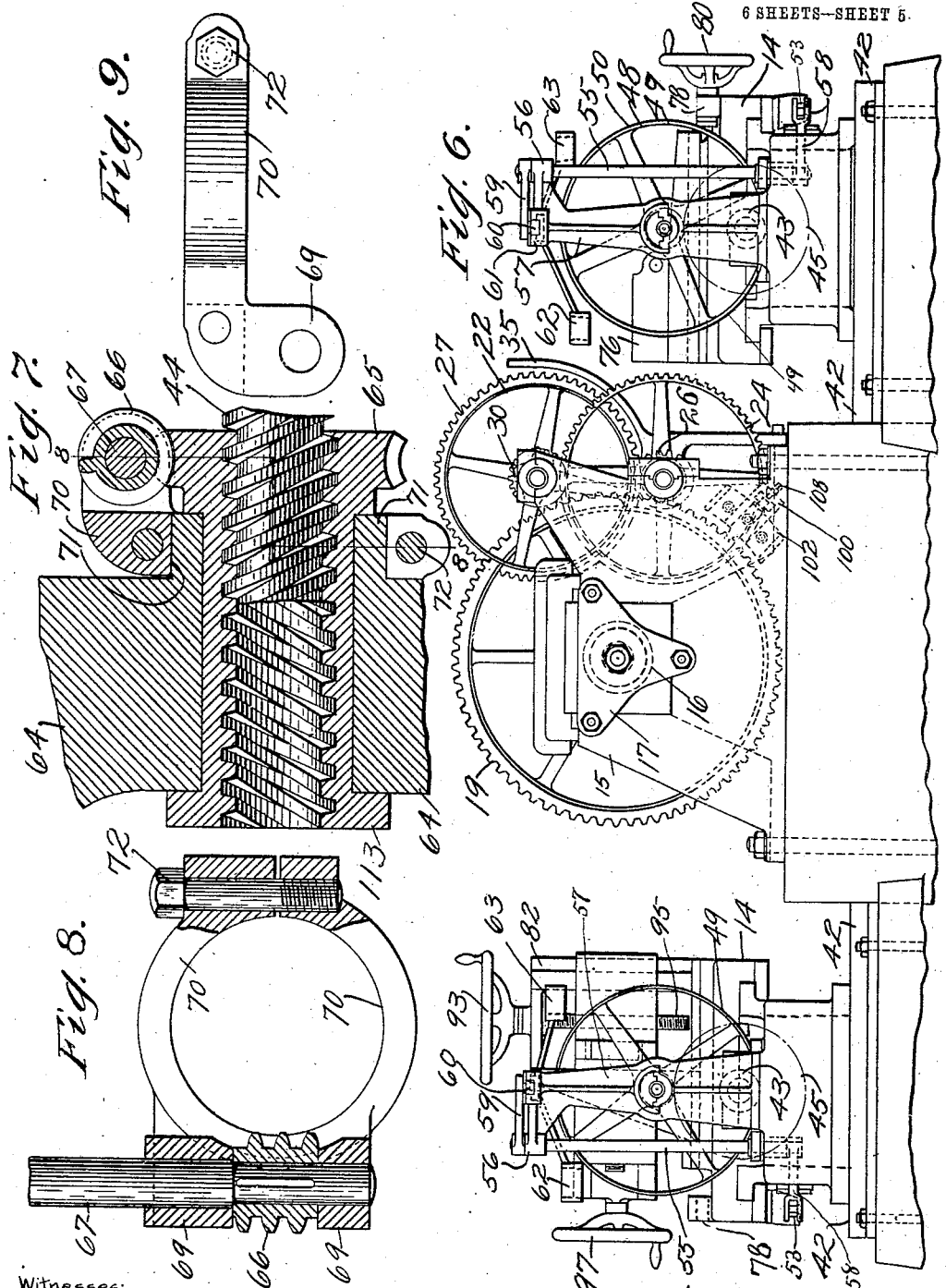
Witnesses:
J. H. Donahue.
Robert Adt.
Inventors.
Joseph W. Neidhardt.
Jacob S. Detrick.
By their Attorney,
F. H. Richards.

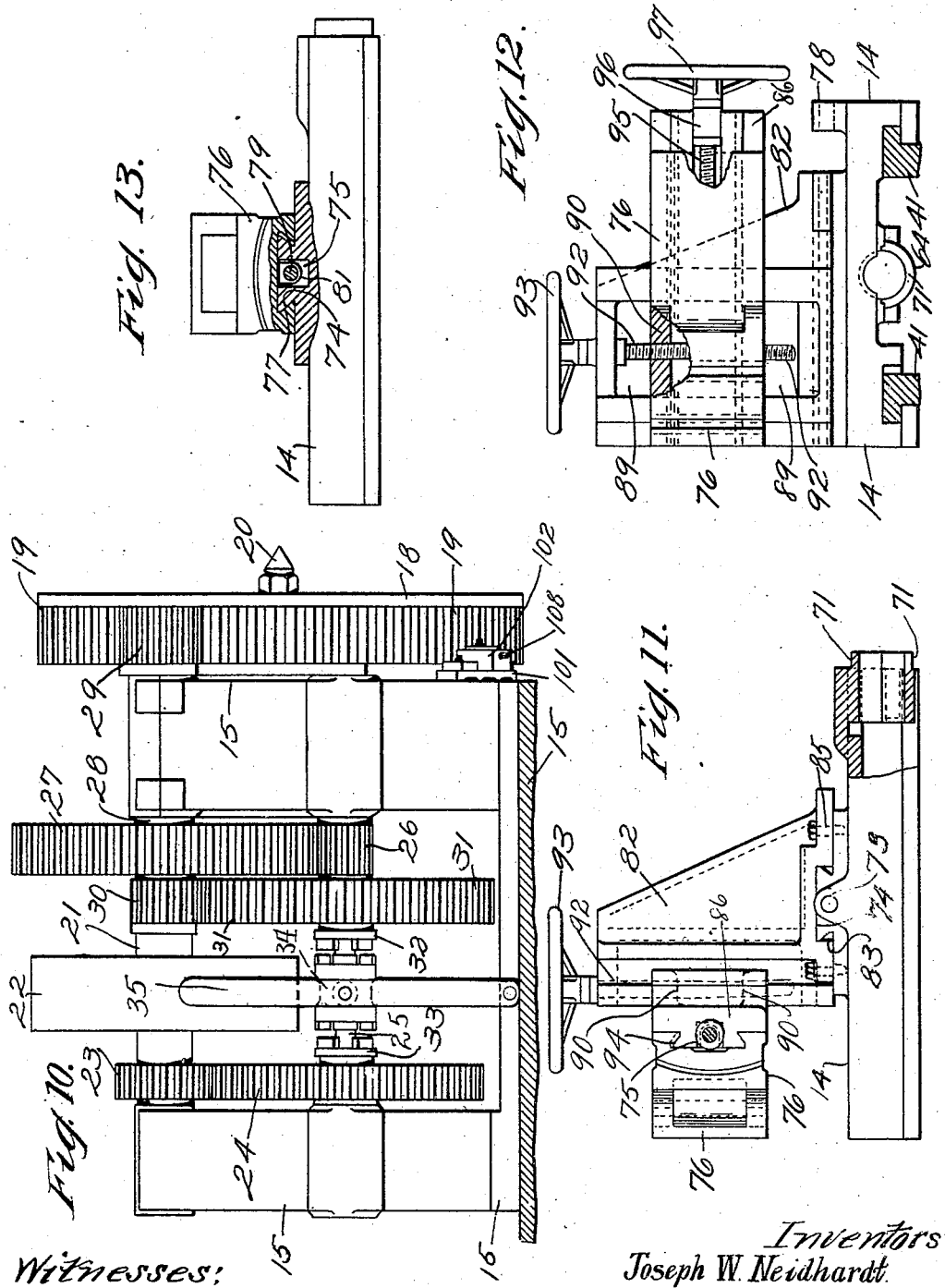

UNITED STATES PATENT OFFICE.

JACOB S. DETRICK AND JOSEPH W. NEIDHARDT, OF BALTIMORE, MARYLAND.

STONE TURNING AND CUTTING MACHINE.

No. 855,234.　　　　　Specification of Letters Patent.　　　　Patented May 28, 1907.

Application filed January 30, 1906. Serial No. 298,605.

*To all whom it may concern:*

Be it known that we, JACOB S. DETRICK, a citizen of the United States, residing at Baltimore, in the State of Maryland, and JOSEPH W. NEIDHARDT, a citizen of the United States, residing at Baltimore, in the State of Maryland, have invented certain new and useful Improvements in Stone Turning and Cutting Machines, of which the following is a specification.

This invention relates to machines for working stone, especially for dressing stone columns.

The object of the invention is to provide a machine or apparatus that can turn up a stone column or cylinder from the rough, and thereupon, without removing the stone from the centers, can produce fluting or longitudinal planing of the turned column.

The primary object of this invention is the provision of an improved open-top stone column dressing machine, that is, a machine in which the diameter of the stone to be dressed is not limited by a cross-beam or other member extending crosswise of and above the stone for carrying a cutting or dressing tool; and in which a massive stone once it is placed in position on its supporting means can be completely finished without the rehandling thereof and without the necessity of reciprocating the stone back and forth under a cutting tool, or of adjusting it to the tool; and in which the cutting or dressing tools, one at each side of the stone column, are reciprocated back and forth both together while the stone is stationary, and also either or both while the stone is being rotated, such tool having a fixed relative speed lengthwise of and during the rotary movement of the stone. By rotating the stone and simultaneously reciprocating the tool lengthwise thereof during such rotation a stone column can be turned up from the rough in a much quicker and better manner than is the case where the stone is reciprocated back and forth under a fixed cutting tool as in the ordinary stone planer, and by so constructing the machine that a different kind of work may be done on the stone when the latter is held against rotation, by tools carried by the same traveling carriage located one at each side of the stone and operative together or independently of each other as occasion may require, a machine is provided which actual practice has demonstrated is superior to anything known in the stone working art.

Figure 2:
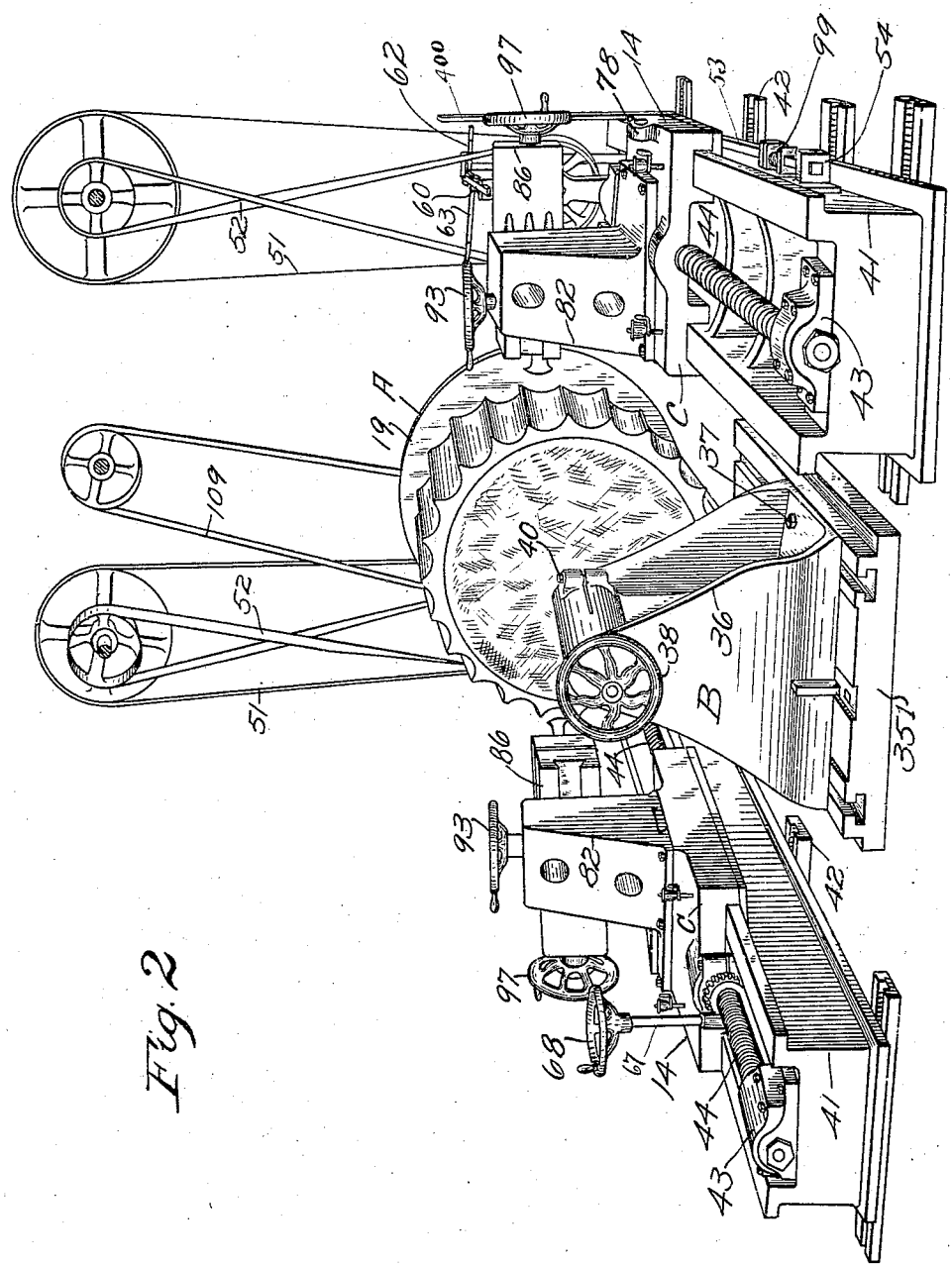

In the drawings representing an embodiment of our invention, Figure 1 is a perspective view of the machine in the operation of turning a column, but showing the upright 82 removed from the carriage 14 on the right hand runway 41 and the tool holder 76 mounted directly on said carriage; Fig. 2 is a similar view, but showing the operation of fluting with both uprights 82 on the carriages 14, Fig. 3 is a plan view of the machine as shown in Fig. 1; Fig. 4 shows the machine in side elevation, Fig. 5 shows in perspective the pawl mechanism for locking the face plate in successive positions or fluting the column, Fig. 6 is an end elevation from front end of the machine as assembled in Figs. 1 and 3, Fig. 7 is a fragmentary horizontal section through the rotatable nut for the feed screw of the carriage, Fig. 8 is a sectional view on the line 8—8 of Fig. 7 with the nut removed, Fig. 9 shows the ring clamp supporting the worm shaft for operating the feed nut, Fig. 10 shows in side elevation the driving mechanism for the face plate, Fig. 11 shows in side elevation the traveling carriage of the tool holder, Fig. 12 shows the same parts in end elevation; and Fig. 13 is a view somewhat similar to Fig. 11, with the upright removed, and the tool holder slide mounted directly on the carriage.

The machine comprises essentially a head stock device denoted generally by A; a tail stock B; and two tool carriage mechanisms C, C that are arranged on opposite sides of the head and tail stocks. These latter are practically duplicates, and a description of one will answer for both, the same reference letters being applied to the corresponding parts of each.

The head stock A consists of a frame work 15 arranged to support in suitable bearings a main driving spindle 16, which may be provided with a suitable form of thrust bearing, denoted generally by 17. The spindle 16 has on one end a face-plate 18, whose periphery is provided with gear teeth 19. The face-plate has a center 20, which is the live center of the machine.

When the machine is used for the turning operation, it is driven from a shaft 21 that is operated by a pulley 22, preferably from an overhead counter shaft or other suitable means. Two sets of gear connections are shown for driving the face-plate 18 from the shaft 21, which are best shown in Figs. 3 and 10. A pinion 23, fast on the shaft 21, meshes with a gear 24 loose on a shaft 25 that is rotatably supported immediately below the shaft 21. On this shaft 25 is secured a pinion 26 that engages a gear 27, fast on a stub shaft 28. And the shaft 28 carries a pinion 29, meshing with the gear 19 of the face-plate, whereby the latter is driven. The shaft 21 also carries a pinion 30 meshing with a gear 31, loose on the shaft 25; but the pinion 30 is smaller than the pinion 23, while the gear 31 is larger than the gear 24. The gear 31 carries a clutch portion 32, and the gear 24 has a clutch portion 33 on one face, as shown. On the shaft 25 is clutch member 34 that has clutch portions on its ends arranged to engage respectively with the clutch portions 32 and 33, alternately, as the clutch member is shifted toward either of such clutch portions of the gears, by means of a lever 35, suitably pivoted to the face of the machine, by which means the gear 31, or else the gear 24, with which the clutch member engages becomes locked to the shaft 25 and will rotate therewith. The other of these two gears will obviously be loose on the shaft and can rotate thereon freely. Either of these clutch gears being locked to the shaft 25, will rotate the pinion 26, and through the gear members 27 and 28, will operate the head stock and live spindle.

The tail stock B comprises a runway 351 on which is adjustably secured the tail stock slide 36, to move to and from the head stock, and to be clamped by suitable bolts 37. The tail stock spindle is adjustable by means of the end hand wheel 38 to move the dead center 39 toward and from the live center 20; and which may be clamped in adjusted positions by a clamping bolt 40.

Each tool carriage mechanism comprises a runway 41 that may be adjustably mounted on supports 42 to be shifted toward and from the line of centers; and which serves to support and guide a tool carriage 14. The runway carries bearings 43 in which is mounted a feed screw 44, but which is prevented from endwise movement. The feed screw 44 carries a gear 45 on one end that meshes with a pinon 46 fast on a shaft 47; which shaft is driven by means of a pulley 48, by belt from any suitable source of power, such as an overhead pulley as shown in Fig. 1. On the shaft 47 are loose pulleys 49 and 50 on opposite sides of the drive pulley 48, for the use of forward and reversing belts, such as 51 and 52. When one of the belts is driving the pulley 48, the other belt is rotating one of the idler pulleys. Automatic means are provided for shifting the belts 51 and 52 to reverse the rotation of the feed screw 44. A bar 53 is slidable in guideways 54 along the runway and carries tappets 99 engaged by a detent 98 on the tool carriage at certain periods in the travel of the latter to be thereby shifted endwise at the limits of travel of the carriage. A rock shaft 55 is vertically supported in bearings 56 on an upright 57, and carries at its lower end an arm 58 that is pivotally connected with the bar 53, whereby the shaft 55 is rocked by the reciprocation of the bar. At its upper end the rock shaft carries an arm 59 pivotally connected with a bar 60, movable in bearings 61. The bar 60 carries an apertured arm 62 engaging the belt 52; and also carries an apertured arm 63 engaging the belt 51. By this means it will be seen that the shifting of the bar 53 will shift one of the belts 51 or 52 onto the live pulley 48, whereby the feed screw 44 will be rotated in either direction as required, to advance the tool carriage 14. A suitable hand lever 400 is provided pivoted adjacent to its lower end and in position to operate the belt shifting mechanism with which it is connected through the medium of the bar 53.

Each tool carriage 14 is provided with a nut member for engaging the screw shaft 44. On one side of the machine the tool carriage is shown as provided with a nut member 113 rotatably mounted in a bearing portion 64 of the carriage. The nut carries a worm wheel 65 at one end, that may be integral therewith, and which engages a worm 66 secured on an upright shaft 67. This shaft is provided with a hand wheel 68 at its upper end for rotation by the operator. The worm shaft is carried in bearings 69, 69, forming part of a split ring 70, that is clamped by a screw 72 on a neck 71, extending from the bearing portion 64 of the carriage. The worm 66 will prevent the rotation of the worm wheel on the nut, and hence will normally hold the nut stationary; whereby the rotation of the feed screw 44 will advance the carriage in the usual manner. But when the feed screw is stationary, the carriage can be advanced by turning the worm shaft, which will rotate the nut through the worm wheel, and by the engagement of the latter with the screw, will move the carriage either way as desired. On the right hand side of the machine, Fig. 1, the worm wheel adjustment of the carriage is shown as located at the forward end of the carriage, and operated by a similar hand wheel 68, which mechanism being identical with that just described, need not be further set forth.

Each tool carriage 14 is provided with a tool holder, that can be removably and adjustably mounted on top of the tool carriage; and there is further provided an upright or supporting member constructed to be mounted on the tool carriage in place of the tool holder by removal of the latter, which upright is provided with means for adjustment of the same tool holder thereon whereby the latter can be adjusted both vertically and horizontally.

On the top of the tool carriage 14 is provided a dove-tail guide 74 having at the intermediate portion a slot 75, (see Figs. 11 and 13). A tool holder 76 is provided with a dove-tail slot 77 shaped to permit the tool holder to engage the said guide 75, whereby the tool holder can be moved to and from the line of centers.

At the front of the tool carriage 14 is arranged a lug 78 whose bore engages an adjusting screw 79 provided with a hand wheel 80, the screw 79 being rotatable in the lug, but prevented from endwise movement. The tool holder 76 has a lug 81 projecting into the slot 75, which has a threaded bore that can be engaged by the screw 79; whereby the rotation of the screw will serve to reciprocate the tool holder. The upright or supporting member 82 contains a dove-tail slot 83 in its base, corresponding to the slot 75 in the tool holder, whereby upon removal of the tool holder, the upright can be mounted on the tool carriage to engage the dove-tail guide 74, as shown in Fig. 11. The upright is clamped in such position by any suitable means such as bolts 85. A saddle 86 has a dove-tail slot 87, (see Fig. 3), and is vertically movable on one side face of the upright 82 by engagement with a dove-tail guide 88 on the side face of the upright. The latter side face of the upright has an open portion 89 into which projects a piece 90 from the saddle, that has a threaded bore 91 engaged by the screw 92 rotatably mounted on the upright, and controlled by a hand wheel 93; whereby the saddle is vertically adjustable. The side face of the saddle is provided with a dove-tail guide 94 (see Fig. 11), that is constructed to be engaged in the dove-tail slot 75 of the tool holder 76. The guide 94 is slotted at its middle portion. The saddle 86 has a screw 95 mounted in a bearing 96 to rotate therein but prevent it from advancing, the screw being operated by a hand wheel 97. The screw 95 is arranged to engage the nut portion 81 of the tool holder 76, whereby the latter is adjusted thereon for the cross feed. By this mechanism the tool can be adjusted vertically relative to the work, and can be given a cross feed in such adjusted positions. In such position the tool holder is best adapted for the fluting operation or for longitudinally cutting of the stone mounted between the centers; the carriage being operated for longitudinal feed by the screw 44. The stone to be operated upon is mounted between the centers, and secured to the face plate in any suitable manner, such as by bolts passing into apertures in leaded sockets in the stone.

For the turning operation, which would precede the fluting operation, the upright 82 is removed from the carriage and the tool holder 76 is mounted directly upon the carriage, as shown at the right side in Fig. 1, and also shown in Figs. 3, 5 and 13. The stone would preferably be turned from one side only; although if desired an inverted cutting tool could be mounted on the opposite side for simultaneously acting upon the stone. During the turning operation the face plate and the stone are rotated from the drive pulley 22, which may be by a belt 109 engaging a pulley 110 on a suitable overhead shaft, not shown. The tool carriage carrying the cutting tool during this operation is not advanced by means of the belts 51 and 52. These two belts are arranged to be free from the drive pulley 48, and a belt 111 is arranged between the pulley 48 and a pulley 112 fast on the live spindle 16 of the head stock. By this arrangement the tool carriage will have a fixed relative speed to that of the live spindle rotating the stone, and therefore a proper cutting speed can be given to the tool in its longitudinal feed.

When the turning operation is completed, the belt 109 is removed, or else the countershaft is stopped so that the live spindle will not rotate; and the belt 111 is removed from the pulleys 48 and 112. And the tool carriage on each side is reciprocated by the belts 51 and 52 in the manner hereinbefore set forth.

When it is desired to flute or longitudinally cut the stone that has been turned as just described, the live spindle and head stock are clamped in the desired successive positions of the revolution of the stone by suitable means. In Fig. 5 is shown a detent member 100 that is adjustable on the machine to engage between the teeth of the gear 19 of the face plate. On a portion 101 of the frame is mounted a block 102 having two slotted portions 103, through which project clamping bolts 104 fast in the plate 101. The block 102 has a slotted portion 105 in which slides the detent 100, and the latter is provided with a slot 106 through which projects a clamping bolt 107 to secure the detent in adjusted position. The detent can be moved up to engage with the gear by means of a bolt 108 that screws in the member 102. For the fluting or lengthwise cutting of the stone, the tool holder is mounted on the saddle of the upright, in each carriage member as shown in Fig. 2. And the tool carriage on each side is reciprocated by the belts 51 and 52 in the manner hereinbefore set forth. After a cut has been taken, the detent 100, is released and retracted, and the face plate is swung through a sufficient distance to produce the next fluting. Thereupon the detent is to be shifted to engage another toothed space on the gear 19. If at this position it does not register properly with a gear space, the block 102 is shifted by releasing the bolts 104.

Having thus described our invention, we claim:

1. A stone dressing machine constructed and organized for performing different kinds of work on massive stone columns without the rehandling of said columns, comprising in combination means for supporting the column at each end thereof, means for holding said column in a fixed position and adjustable to permit intermittent or continuous rotation of said column, means for rotating said column, a tool carriage at each side of said column, and means for moving each of said carriages longitudinally of the column during the rotation of the latter to permit the turning of the column and also intermediate its intermittent rotations and when the column is fixed against movement to permit the grooving or fluting thereof.

2. A stone dressing machine constructed and organized for performing different kinds of work on massive stone columns without the rehandling of said columns, comprising in combination means for supporting the column at each end thereof, means for holding said column in a fixed position and adjustable to permit intermittent or continuous rotation of said column, means for rotating said column, a runway at each side of said column-supporting means and adjustable to the same extent throughout toward and from said column-supporting means, a tool carriage on each of said runways, and means for moving each of said carriages lengthwise of the column during the rotation of the latter to permit the turning of the column and also intermediate its intermittent rotations and when the column is fixed against movement to permit the grooving or fluting thereof.

3. A stone dressing machine constructed and organized for performing different kinds of work on massive stone columns without the rehandling of said columns, comprising in combination means for supporting the column at each end thereof, means for holding said column in a fixed position and adjustable to permit rotation thereof, means for rotating said column, a tool carriage located at each side of said column, means operative through the medium of the column-rotating means for moving one or both of said carriages longitudinally of the column during the rotation thereof and whereby the carriage will have a fixed relative speed to that of the column, and means for moving both of said carriages longitudinally of said column when the latter is fixed against movement to permit the grooving or fluting of the same.

4. A stone dressing machine constructed and organized for performing different kinds of work on massive stone columns without the rehandling of said columns, comprising in combination means for supporting the column at each end thereof and including a geared face plate, means coöperating with said face plate gear for holding said column in a fixed position and adjustable to permit intermittent and continuous rotation thereof, means for rotating said column and comprising gearing one member of which is in mesh with said face plate gear, a tool carriage located at each side of said column, one or both movable longitudinally of the column during the rotation of the latter to permit the turning of the column, and both movable longitudinally thereof when the column is fixed against movement to permit the grooving or fluting thereof, and means for moving said carriages.

5. A stone dressing machine constructed and organized for performing different kinds of work on massive stone columns without the rehandling of said columns, comprising in combination means for supporting the column at each end thereof, means for holding the column in a fixed position and operative to permit the rotation thereof, means for rotating said column at different speeds and comprising two sets of gears, clutch mechanism between a pair of loosely mounted gears, one of each set, a tool carriage movable longitudinally of the column during the rotation of the latter to permit the turning of the column and also when the column is fixed against movement to permit the grooving or fluting of the column, and means for moving said carriage.

6. A stone dressing machine constructed and organized for performing different kinds of work on massive stone columns without the rehandling of said columns, comprising in combination means for supporting the column at each end thereof, means for holding the column in a fixed position and operative to permit the rotation thereof, means for rotating said column at different speeds and comprising two sets of gears, clutch mechanism between a pair of loosely mounted gears, one of each set, a pair of tool carriages located one at each side of said column and movable longitudinally of the column during the rotation of the latter to permit the turning of the column and also when the column is fixed against movement to permit the grooving or fluting of the column, and means for moving said carriages.

7. A stone dressing machine constructed and organized for performing different kinds of work on massive stone columns without the rehandling of said columns, comprising, in combination, means for supporting the column at each end thereof, means for holding said column in a fixed position and operative to permit the rotation thereof, means for rotating said column, a tool carriage, means for moving said carriage longitudinally of the column during the rotation of the latter, means carried by said carriage for turning the column, means for adjusting said means toward and from the column, means for also moving said carriage longitudinally of the column when the latter is fixed against movement, means adapted to be mounted on said carriage on the removal of the turning tool for grooving or fluting the column, and means for adjusting said means in the plane of the column and also toward and from said column.

8. A stone dressing machine constructed and organized for performing different kinds of work on massive stone columns without the rehandling of said columns, comprising, in combination, means for supporting the column at each end thereof, means for holding said column in a fixed position and operative to permit the rotation thereof, means for rotating said column, a tool carriage movable longitudinally of the column during the rotation thereof and also when fixed against rotation, means for moving said carriage, a removable upright mounted on said carriage, a tool holder carried thereby and adjustable in the plane of the column and toward and from the same to permit grooving or fluting of the column and adapted to be mounted on said carriage on the removal of said upright and adjustable toward and from the column.

9. A stone dressing machine constructed and organized for performing different kinds of work on massive stone columns without the rehandling of said columns, comprising, in combination, means for supporting the column, means for holding said column in a fixed position and operative to permit the rotation thereof, means for rotating said column, a tool carriage located at each side of the column for movement longitudinally of the column during the rotation of the latter and also when the column is fixed against movement, means for moving one or both of said carriages, tools carried by said carriages for turning the column and adjustable toward and from the column, means adapted to be mounted on said carriages on the removal of the turning tool for carrying grooving or fluting tools, and means for adjusting said tools in the plane of the column and also toward and from said column.

10. A stone dressing machine constructed and organized for performing different kinds of work on massive stone columns without the rehandling of said columns, comprising, in combination, means for supporting the column at each end thereof and including a geared face plate, means for holding the column in a fixed position and operative to permit the rotation thereof, means for rotating said column at different speeds and comprising two sets of gears one in mesh with said face plate gear, clutch mechanism between a pair of loosely mounted gears one of each set, a tool carriage movable longitudinally of the column during the rotation of the latter to permit the turning of the column and also when the column is fixed against movement to permit the grooving or fluting of the column, and means for moving said carriage.

11. A stone dressing machine constructed and organized for performing different kinds of work on massive stone columns without the rehandling of said columns, comprising, in combination, means for supporting the column at each end thereof and including a geared face plate, means coöperating with said face plate gear for holding said column in a fixed position and operative to permit the rotation thereof, means for rotating said column at different speeds, and comprising two sets of gears, one set having a gear in mesh with said face plate gear, clutch mechanism between a pair of loosely mounted gears one of each set, a tool carriage located at each side of said column and one or both movable longitudinally of the column during the rotation of the latter to permit the turning of the column, means for moving either or both of said carriages and operative through the medium of the column-rotating means whereby each carriage will have a fixed relative speed to that of the column, means for moving both of the carriages on occasion longitudinally of the column when the same is fixed against movement for grooving or fluting the same, and means for automatically reversing said carriages.

12. A stone dressing machine constructed and organized for performing different kinds of work on massive stone columns without the rehandling of said columns, comprising, in combination, means for supporting the column at each end thereof and including a geared face plate, means coöperating with said face plate gear for holding said column in a fixed position and operative to permit the rotation thereof, means for rotating said column at different speeds and comprising two sets of gears, one set having a gear in mesh with said face plate gear, clutch mechanism between a pair of loosely mounted gears one of each set, a tool carriage located at each side of said column and one or both movable longitudinally of the column during the rotation of the latter to permit the turning of the column, means for adjusting said carriages longitudinally of the column, means for moving either or both of said carriages and operative through the medium of the column-rotating means whereby each carriage will have a fixed relative speed to that of the column, means for moving both of the carriages on occasion longitudinally of the column when the same is fixed against movement for grooving or fluting the same, and means for automatically reversing said carriages.

13. A stone dressing machine constructed and organized for performing different kinds of work on massive stone columns without the rehandling of said columns, comprising, in combination, means for supporting the column at each end thereof and including a geared face plate, means for rotating said face plate, means for holding said face plate against rotation and comprising a detent in position to engage the teeth of said geared face plate to lock the same and thereby the column against rotation, said detent having an adjustment in the plane of movement of said face plate, and means for dressing said column.

14. A stone dressing machine constructed and organized for performing different kinds of work on massive stone columns without the rehandling of said columns, comprising, in combination, means for supporting the column at each end thereof, means for holding said column in a fixed position and operative to permit the rotation thereof, means for rotating said column, a runway located at each side of said column, a traveling tool carriage mounted on each of said runways, means for moving said carriages on said runways, means for automatically reversing each of said carriages, and means carried by each of said carriages for permitting the manual adjustment of the carriage on said runway.

15. A stone dressing machine constructed and organized for performing different kinds of work on massive stone columns without the rehandling of said columns, comprising, in combination, means for supporting the column at each end thereof, means for holding said column in a fixed position and operative to permit the rotation thereof, means for rotating said column, a runway located at each side of said column, a traveling tool carriage mounted on each of said runways, means for moving said carriages on said runways and including a rotatable screw, means for automatically reversing each of said carriages, and means carried by each of said carriages for permitting the manual adjustment of the carriage on said runway and including worm gearing for locking the carriage to the screw when the screw is rotated and for adjustment of the carriage on the screw when the same is stationary.

16. A stone dressing machine constructed and organized for performing different kinds of work on massive stone columns without the rehandling of said columns, comprising, in combination, means for supporting the column at each end thereof, means for holding said column in a fixed position and operative to permit the rotation thereof, means for rotating said column, a runway located at each side of said column, a traveling tool carriage mounted on each of said runways and movable longitudinally of the column during the rotation thereof to permit the turning of the column and also when the column is fixed against movement to permit the grooving or fluting thereof, means for moving each of said carriages, a removable tool holder carried by each of said carriages and adjustable toward and from the column, an upright adapted to be mounted on each of said carriages on the removal of said tool holder, a saddle mounted on said upright and adjustable in the plane of the column for supporting said tool holder on its removal from said carriage, and means for adjusting said tool holder on said upright toward and from the column.

17. A stone dressing machine constructed and organized for performing different kinds of work on massive stone columns without the rehandling of said columns, comprising, in combination, adjustable means for supporting the column at each end thereof, means for holding said column in a fixed position and operative to permit the rotation thereof, means for rotating said column, a runway located at each side of said column and adjustable toward and from the column, a traveling tool carriage mounted on each of said runways and movable longitudinally of the column during the rotation thereof to permit the turning of the column and also when the column is fixed against movement to permit the grooving or fluting thereof, means for moving each of said carriages, a removable tool holder carried by each of said carriages and adjustable toward and from the column, an upright adapted to be mounted on each of said carriages on the removal of said tool holder, a saddle mounted on said upright and adjustable in the plane of the column for supporting said tool holder on its removal from said carriage, and means for adjusting said tool holder on said upright toward and from the column.

18. A stone dressing machine constructed and organized for performing different kinds of work on massive stone columns without the rehandling of said columns, comprising in combination, means for supporting the column at each end thereof, means for holding said column in a fixed position and operative to permit the rotation thereof, means for rotating said column at different speeds, a runway located at each side of said column, a traveling carriage mounted on each of said runways and movable longitudinally of the column during the dressing thereof, means for adjusting each of said carriages on said runway, and means for automatically reversing said carriages at predetermined periods during the work on said column.

19. A stone dressing machine constructed and organized for performing different kinds of work on massive stone columns without the rehandling of said columns, comprising, in combination, a column supporting runway, adjustable means thereon for supporting a stone column for dressing, a runway located at the side thereof and adjustable toward and from said column supporting runway, one runway being higher than the other, a traveling tool carriage mounted on said last runway and movable thereon both when the column is fixed against movement and when rotating, means for rotating said column, and means for holding said column fixed against movement.

20. In a stone column turning and cutting machine, the combination of a head stock member provided with a live spindle, a face-plate on one end of the spindle, a live center on the face plate, means for rotating the face plate, a tail stock member provided with a dead center alining with the live center, a runway on each side of the line of centers, each runway being provided with a traveling carriage, means for reciprocating each carriage, means for driving said latter means at a predetermined speed relative to the rotation of the face plate, a tool holder mounted on each carriage and adjustable relative to the line of centers, a means for locking the face plate in successive positions of its revolution.

21. In a stone column turning and cutting machine, the combination of a head stock member provided with a live spindle, a face plate on said spindle, a live center on the face plate, a driving pulley carried by the head stock, means for operating the live spindle from said pulley, a tail stock member provided with a dead center in alinement with the live center, a runway on each side of the line of centers, a carriage movable on each runway, a screw shaft carried by each runway, a nut member on each carriage in engagement with the screw shaft to advance the carriage upon rotation of the shaft, pulleys connected with each screw shaft comprising a drive pulley and two idlers, and a pulley on the head stock operatively connected with the live spindle, the latter pulley being in alinement with the drive pulleys of the screw rods whereby either tool carriage may be driven by belt from the live spindle.

22. In a stone turning and cutting machine, the combination with a runway and tool carriage, of an upright removably mounted on the tool carriage, a saddle member carried by the upright and vertically adjustable thereon, and a tool holder removably secured to the saddle, said tool holder and tool carriage being organized whereby upon removal of the tool holder from the saddle, the tool holder can be mounted on the tool carriage in place of the upright.

23. In a stone turning and cutting machine, the combination of a runway, a carriage movable on the runway, an upright removably secured on the tool carriage, a saddle carried by the upright and vertically adjustable thereon, and a tool holder organized to be removably mounted on the saddle, and also to be removably mounted on the tool carriage upon removal of the upright therefrom.

24. In a stone turning and cutting machine, the combination of a runway, a carriage movable on the runway and provided with a dovetail guide extending transversely along its upper face, an upright having a dove-tail slot on its lower face arranged to engage said guide to removably secure the upright on the tool carriage, a saddle carried by the upright and vertically adjustable thereon, the saddle being provided with a dove-tail guide on its outer face corresponding in section to the dove-tail guide on the tool carriage, and a tool holder provided with a dove-tail slot on one face whereby the holder can be removably mounted on the dove-tail guide on the saddle, and also can be removably mounted on the dove-tail guide on the tool carriage upon removal of the upright therefrom.

JACOB S. DETRICK.
JOSEPH W. NEIDHARDT.

Witnesses:
JOHN L. WEBB,
HARRY OADES.